(12) United States Patent
Gagnon

(10) Patent No.: US 11,041,519 B2
(45) Date of Patent: Jun. 22, 2021

(54) LATCH FOR WINCH LINE HOOK

(71) Applicant: Antoine Paul Jacob Gagnon, Beaumont (CA)

(72) Inventor: Antoine Paul Jacob Gagnon, Beaumont (CA)

(73) Assignee: Antoine Paul Jacob Gagnon, Beaumont (CA)

( * ) Notice: Subject to any disclaimer, the term of this patent is extended or adjusted under 35 U.S.C. 154(b) by 0 days.

(21) Appl. No.: 15/970,090

(22) Filed: May 3, 2018

(65) Prior Publication Data

US 2018/0320723 A1 Nov. 8, 2018

(30) Foreign Application Priority Data

May 4, 2017 (CA) .................................. CA 2964604

(51) Int. Cl.
- *F16B 19/08* (2006.01)
- *F16B 45/00* (2006.01)
- *F16B 19/02* (2006.01)

(52) U.S. Cl.
CPC .............. *F16B 19/08* (2013.01); *F16B 19/02* (2013.01); *F16B 45/00* (2013.01); *B66D 2700/02* (2013.01)

(58) Field of Classification Search
CPC ....... F16B 19/08; F16B 45/00; B66D 2700/02
See application file for complete search history.

(56) References Cited

U.S. PATENT DOCUMENTS

| | | | | |
|---|---|---|---|---|
| 1,498,691 A * | 6/1924 | Kearns | ..................... | E21B 19/04 294/82.16 |
| 3,733,097 A * | 5/1973 | Hank, Jr. | ................... | E02B 3/24 294/175 |
| 4,195,872 A * | 4/1980 | Skaalen | ..................... | B66C 1/36 24/599.6 |
| 5,538,303 A * | 7/1996 | Dunham | ................. | B63B 21/54 24/599.1 |
| 8,342,116 B1 * | 1/2013 | Cardarelli | ............... | B63B 21/54 114/221 R |
| 2008/0301917 A1 * | 12/2008 | Lee | .......................... | F16B 45/00 24/599.1 |
| 2012/0280523 A1 * | 11/2012 | Costa | ....................... | B66D 1/00 294/82.11 |
| 2013/0312224 A1 * | 11/2013 | Nommensen | ............ | B25G 1/04 16/429 |

* cited by examiner

*Primary Examiner* — Robert Sandy
*Assistant Examiner* — David M Upchurch
(74) *Attorney, Agent, or Firm* — Field LLP

(57) ABSTRACT

A hook latch is provided for use with a tail chain hook, said hook having a curved outer spine, an inner surface, a hook end and an opening defined between the inner surface and the hook end through which a load can be hooked. The hook latch has a band for engagement about the outer spine of the hook and a plug positionable between the hook end and the inner surface of the hook and releasably engagable with the band to block the opening of the hook.

9 Claims, 7 Drawing Sheets

LATCH FOR WINCH LINE HOOK

FIELD OF THE INVENTION

The present invention relates to a device for latching closed a winch line tail chain hook.

BACKGROUND OF THE INVENTION

Winch lines typically incorporated a tail chain having a hook that can be used to hook to a load to be winched, or to hook to the winch line itself, or can be shackled to a loading sling for vertical lifting, in which the chain is looped into a sling when used while hoisting loads vertically. In a sling configuration two loops of the chain are hooked or shackled into the tail chain hook so that it may pull in a straight line.

Winch line tail chain hooks are commonly open hooks. With reference to FIG. 1, tail chain hooks 2 typically comprise a connection 4 to the chain, a curved outer spine 6, an inner surface 8 and an opening 10 defined between a hook end 14 and the inner surface 8 through which a load or further chains can be hooked.

When the hook is hooked to a winch line or a load connection and the winch is pulling, the winch line or load is held in tension in the hook. However, if any slack exists in the winch line, then there is a tendency for the winch line or load line to slip out of the opening 10 and become unhooked. As well, if there is any movement, rotational or laterally, the winch line or load line are often caused to jostle or otherwise work their way out of the hook and make its way to the hook end 14, where again the winch or load line can slip out and become unhooked.

During winching operations, an unhooked winch line or load leads to delays since the winching operation must be stopped, the load or winch line re-connected and checked and then the winching operation restarted again. More seriously however, with the load, the hook, the tail chain and the winch line all under a great deal of tensile force during winching, an unhooking of the load line or winch line can cause objections to recoil and swing about when the large tensile forces are released by unhooking. Such recoiling and swinging about of heavy loads or of the hook itself can cause injury to workers, damage to the winch truck or damage to the load to be winched.

A need therefore exists for means to keep the hook of winch tail chains closed once the hook is engaged. A need also exists for a device to close the opening of the hook that is simple to use and can be affixed and released easily.

SUMMARY

A hook latch is provided for use with a tail chain hook, said hook comprising a curved outer spine, an inner surface, a hook end and an opening defined between the inner surface and the hook end through which a load can be hooked. The hook latch comprises a band for engagement about the outer spine of the hook and a plug positionable between the hook end and the inner surface of the hook and releasably engagable with the band to block the opening of the hook.

It is to be understood that other aspects of the present invention will become readily apparent to those skilled in the art from the following detailed description, wherein various embodiments of the invention are shown and described by way of illustration. As will be realized, the invention is capable for other and different embodiments and its several details are capable of modification in various other respects, all without departing from the spirit and scope of the present invention. Accordingly the drawings and detailed description are to be regarded as illustrative in nature and not as restrictive.

BRIEF DESCRIPTION OF THE DRAWINGS

A further, detailed, description of the invention, briefly described above, will follow by reference to the following drawings of specific embodiments of the invention. The drawings depict only typical embodiments of the invention and are therefore not to be considered limiting of its scope. In the drawings.

The drawings are not necessarily to scale and in some instances proportions may have been exaggerated in order more clearly to depict certain features.

DETAILED DESCRIPTION OF VARIOUS EMBODIMENTS

The description that follows and the embodiments described therein are provided by way of illustration of an example, or examples, of particular embodiments of the principles of various aspects of the present invention. These examples are provided for the purposes of explanation, and not of limitation, of those principles and of the invention in its various aspects.

The present device relates to a latch device for use with a chain tail hook 2 of a winch line. The device works by providing closure to the opening 10 of the hook 2.

Figure 1:
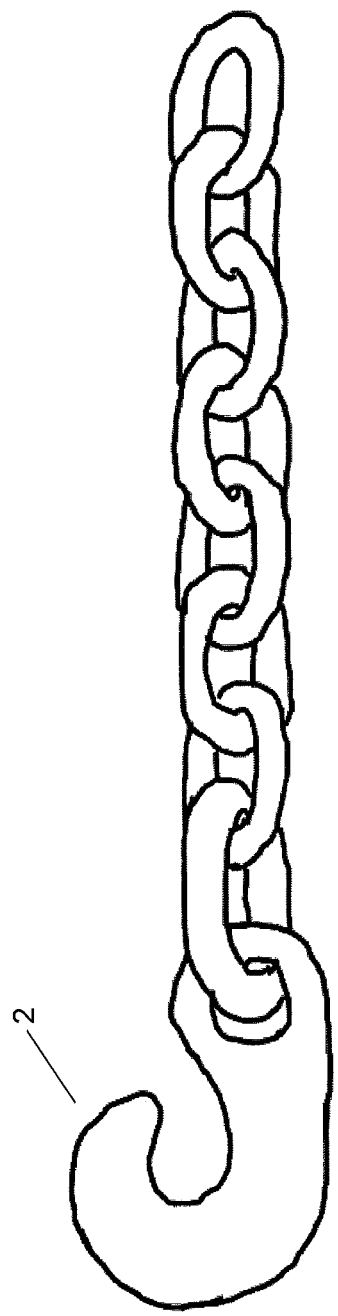
FIG. 1 is a side elevation view of one example of a winch line tail chain hook that can be used with the present invention.
Figure 2:
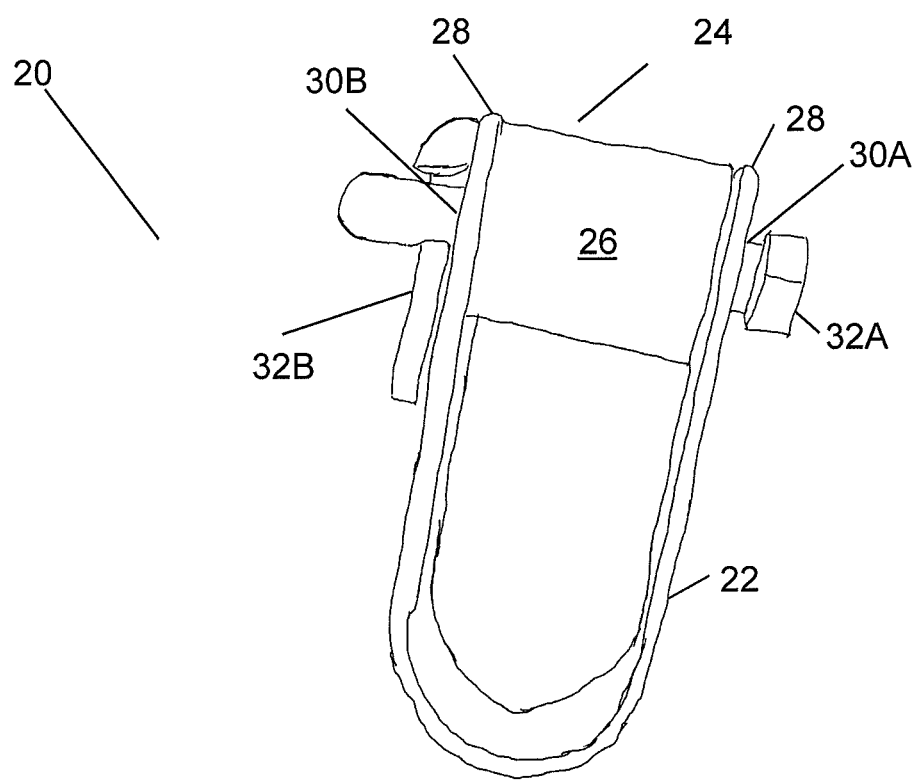
FIG. 2 is a front perspective view of one embodiment of the present invention.
Figure 3:
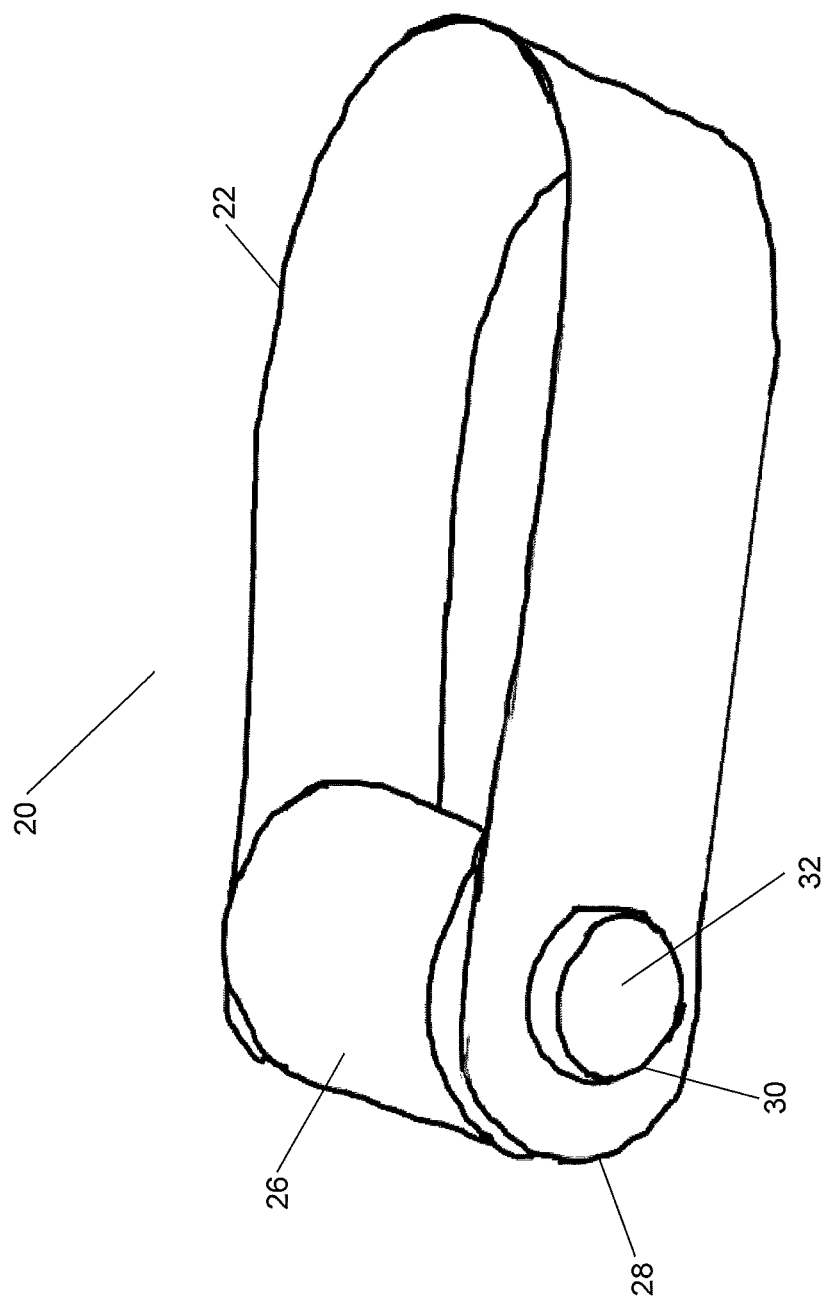
FIG. 3 is a side perspective view of FIG. 2 showing a detail a first side of one embodiment of a retaining means for use with the present invention.
Figure 4:
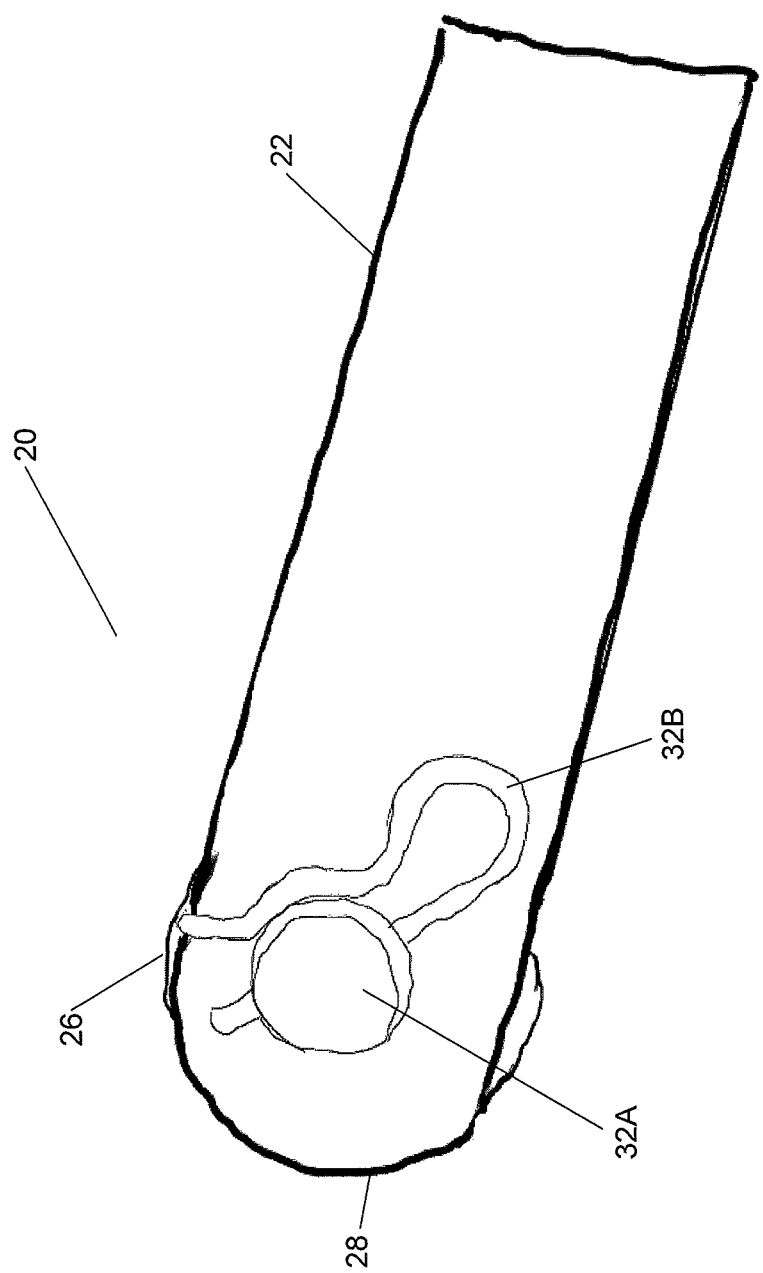
FIG. 4 is a side perspective view of FIG. 2 showing a detail a second side of one embodiment of a retaining means for use with the present invention.
Figure 5:
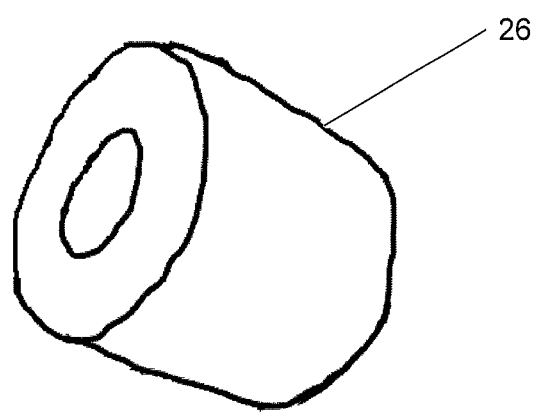
FIG. 5 is a front perspective view of one embodiment of a plug of the present invention.
Figure 6:
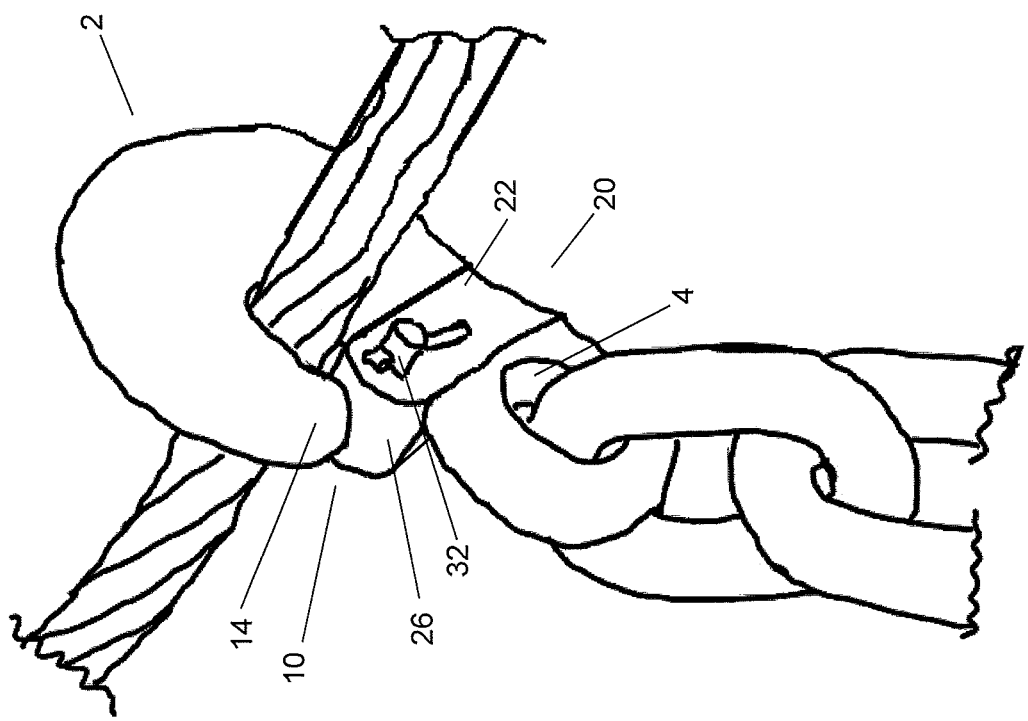
FIG. 6 is a perspective view of one embodiment of the device of the present invention latched to a chain tail hook.
Figure 7:
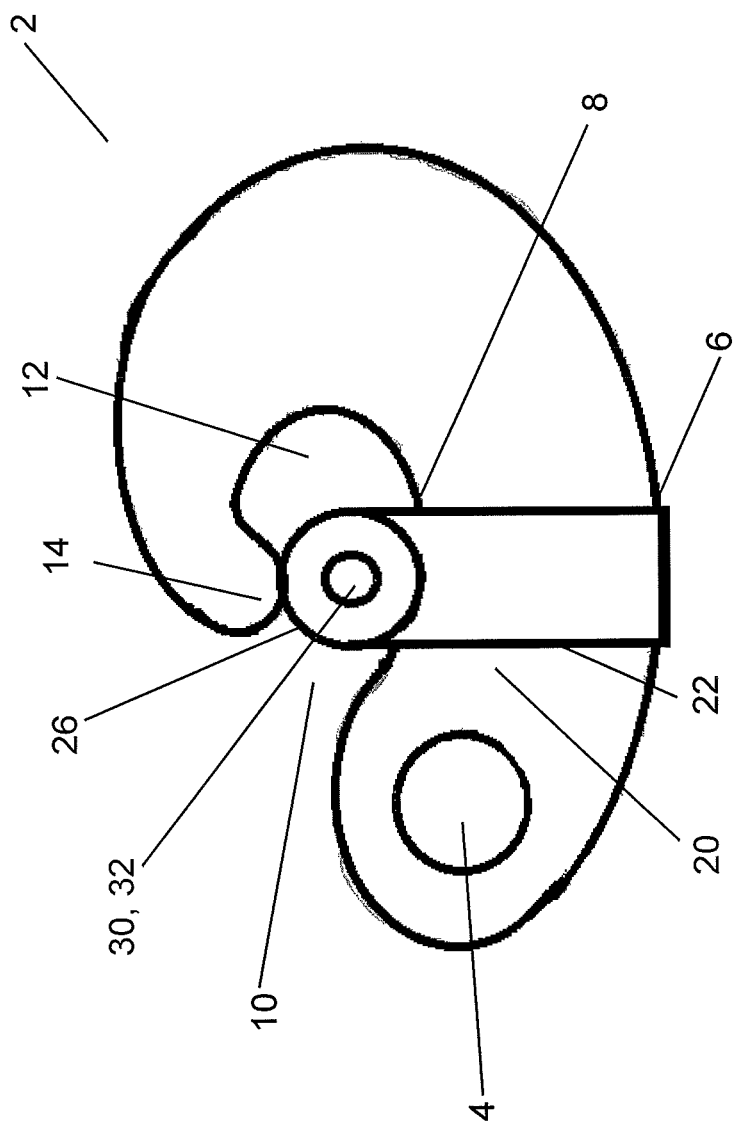
FIG. 7 is a side elevation view of one embodiment of the device of the present invention latched to a chain tail hook.

With reference to FIGS. 2 to 6, the present device takes the form of a latch 20. The latch 20 comprises a band 22 that can be slipped snuggly over the sides and curved outer spine 6 of the hook 2. The band 22 may be comprised of a either rigid or flexible material. For example, the band 22 may comprise a woven web material or a flexible composite material that can be resiliently applied over the hook 2. Alternatively, the band 22 may be made of a rigid material that can preferably be sized to snugly fit the thickness of the outer spine 6 of the hook 2 to be latched. As such, the latch 20 of the present invention can be manufactured in a number of sizes to fit a number of different sizes of hooks 2. In the case of a rigid band 22, the band 22 preferably takes a square bend or rounded, generally u-shaped configuration. More preferably, the band 22 comprises a rounded u-shape with sufficient curve to prevent the band 22 from getting caught on any snags or uneven elements which can cause parts of the hook to become "snagged" and can potentially tear pieces from the load. The design of the present hook latch advantageously also serves to reduce and prevent occurrences of unwanted hooking onto unintended elements on site such as the side of a trailer, brake lines, boards, other items still loaded on the trailer, etc. The band 22 advantageously nestles into and rests against the curved outer spine 6 of the hook. The band 22 comprises a pair of opposing band ends 28 that define an open mouth 24, said open mouth aligning with the opening 10 of the hook 2, when the latch 20 is applied to the hook 2. In practice, thinner bands, for example 1 mm thick and 1.25" wide, can be used for applications with bed trucks or any truck that requires the band 22 to eventually be spooled with the tail chain onto a drum, and a load sling wrapped over the hook and the band. A thicker band, for example ⅛" thick and 1.25" wide, may be used for most other applications.

A plug 26 is provided having a length to fit into the open mouth 24 of the band 22, between the opposing band ends 28. The plug 26 is more preferably cylindrical in shape, although other shapes such as rectangular prisms, cylinders of oval cross-section, are also possible without departing from the scope of the present invention. The plug 26 may be made from any number of materials that do not permanently deform. Without intending to be limiting, some examples of suitable plug materials include metals, rubbers, plastics and nylons, among others.

A thickness of the plug 26 is preferably sized to fit in the opening 10 of the hook 2 between the hook end 14 and the inner surface 8, without falling out of the opening 10 of the hook 2 towards either an eye 12 section of the hook or towards the connection 4. This ensures that the latch 20 closes off the opening 10. For example, for a 1⅛" to 1⅜" tail chain hook, a preferred size of plug 26 can be 1.25" OD and 17/32" ID, with a length to fit opposing ends 28 of the band 22.

The plug 26 can be releasably engaged to the band 22 at the mouth 24 using any number of releasable retaining means 34. For example, the plug 26 may include separate or integral clip, pin or protruding features that cooperate with mating recesses or other features on the opposing band ends 28 of the band 22. In a preferred embodiment of the invention, the plug 26 takes the form of a hollow cylinder and each of the opposing ends 28 of the band 22 comprise a hole 30. A retainer pin arrangement 32 can be inserted through a first hole 30A of the band 22, then through a hollow of the hollow cylindrical plug 26 and finally through a second hole 30B of the band 22, to secure the plug 26 to the band 22. More preferably the retainer pin arrangement 32 takes the form of a clevis pin-hairpin combination, with the clevis pin 32A inserted through the holes 30 and the hollow of the plug 26 and the hairpin 32B inserted into holes in an end of the clevis pin to thereby secure the clevis pin 32A through the plug 26.

In assembly, the band 22 would be slipped snugly over the outer spine 6 of the hook 2, with the opposing ends 28 and open mouth 24 positioned in the opening 10 of the hook 2. The plug 26 is then positioned between the opposing ends 28 of the band 22 and retained therein by either integral or separate retaining means 34.

The present device allows for a rapid latching means to close the opening 10 of a winch line tail chain hook 2 to ensure that load lines or winch lines or anything else being hooked does not inadvertently slip out of the hook 2. The present latch 20 design also allows for quick removal of the latch by simply removing retaining means 34 from the opposing ends 28 of the band 22 and removing the plug 26 and band 22 from the hook 2. The engagement of the band 22 along the outer spine 6 of the hook 2 and the sizing of the plug 26 to fit in the opening 10 between the hook end 14 and inner surface 8 of the hook 2, ensures that the plug 26 does not escape from between the opening 10 and the inner surface 8 of the hook 2. In this way, the present latch 20 blocks the hook opening 10 and prevents any winch or load line or shackle from coming out of the hook 2.

The previous description of the disclosed embodiments is provided to enable any person skilled in the art to make or use the present invention. Various modifications to those embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims. No claim element is to be construed under the provisions of 35 USC 112, sixth paragraph, unless the element is expressly recited using the phrase "means for" or "step for".

The invention claimed is:

1. A latch for a tail chain hook, wherein said latch comprises;
   a. a rigid u-shaped band configured for wrapping around outer sides and a curved outer spine of the tail chain hook, said band defining an open mouth; and
   b. a plug releasably engagable in said open mouth of the band, and configured to be positioned between a hook end and an inner surface of the hook to block an opening of the hook,
   wherein the latch is configured to be separable from the tail chain hook.

2. The latch of claim 1, further comprising a retaining pin arrangement for releasably engaging the plug to the band.

3. The latch of claim 1, wherein the u-shaped band ends in a pair of opposing band ends that define the open mouth, said open mouth aligning with the opening of the hook.

4. The latch of claim 3, wherein the plug has a length to fit into the open mouth of the band, between the opposing band ends.

5. The latch of claim 4, wherein the plug is cylindrical in shape.

6. The latch of claim 5, wherein the plug is made from a material is non-permanently deformable.

7. The latch of claim 6, wherein the plug has a diameter generally equivalent to the opening of the hook between the hook end and the inner surface.

8. The latch of claim 2, wherein the retaining pin comprises a clevis pin, insertable through a first hole of a first opposing end of the band, then through a hollow within the plug and finally through a second hole in a second opposing end of the band, and a hairpin insertable into a hole in an end of the clevis pin.

9. A latch for a tail chain hook, wherein said latch comprises;
   a. a rigid u-shaped band configured for wrapping around outer sides and a curved outer spine of the tail chain hook, said band defining an open mouth;

b. a plug releasably engagable in said open mouth of the band, and configured to be positioned between a hook end and an inner surface of the hook to block an opening of the hook; and
c. a retaining pin arrangement for releasably engaging the plug to the band, said retaining pin comprising a clevis pin, insertable through a first hole of a first opposing end of the band, then through a hollow within the plug and finally through a second hole in a second opposing end of the band, and a hairpin insertable into a hole in an end of the clevis pin, wherein the latch is configured to be separable from the tail chain hook.

* * * * *